(12) United States Patent
Tateishi et al.

(10) Patent No.: US 6,738,327 B2
(45) Date of Patent: May 18, 2004

(54) SERVO CONTROL APPARATUS FOR OPTICAL DISC PLAYER

(75) Inventors: Kiyoshi Tateishi, Tsurugashima (JP); Masaki Kobayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 451 days.

(21) Appl. No.: 09/836,235

(22) Filed: Apr. 18, 2001

(65) Prior Publication Data

US 2002/0001265 A1 Jan. 3, 2002

(30) Foreign Application Priority Data

Apr. 24, 2000 (JP) ..................................... 2000-122468

(51) Int. Cl.[7] ............................................... G11B 7/00
(52) U.S. Cl. ............................... 369/47.26; 369/47.18; 369/47.36; 369/47.44
(58) Field of Search ........................... 369/47.26, 44.27, 369/44.29, 44.32, 47.17, 47.18, 47.36, 47.44

(56) References Cited

U.S. PATENT DOCUMENTS

| | | |
|---|---|---|
| 4,587,644 A | 5/1986 | Fujiie |
| 4,682,314 A | 7/1987 | Nakagaki et al. |
| 4,736,354 A | 4/1988 | Yoshio |
| 5,684,772 A * | 11/1997 | Yamagami et al. ...... 369/47.37 |

FOREIGN PATENT DOCUMENTS

| | | |
|---|---|---|
| EP | 0 392 561 A | 10/1990 |
| JP | 60-89836 A | 5/1985 |

* cited by examiner

*Primary Examiner*—Nabil Hindi
(74) *Attorney, Agent, or Firm*—Sughrue Mion, PLLC

(57) ABSTRACT

A servo control apparatus of an optical pickup includes an extractor for extracting an error signal from the read signal; a driver for changing the servo position; an equalizer for equalizing the error signal to generate a drive signal; a calculator for calculating an integral value of the error signal for each predetermined angular section of rotation; a memory for storing each of the integral values for one rotation of the recording medium; a detector to detect an occurrence of a dropout; a calculator for calculating a variation by comparing the integral value for an angular section of rotation where the dropout occurred with a stored integral value for the identical angular section of rotation prior to the occurrence of the dropout; and a controller for changing an equalization characteristics of the equalizer in accordance with the variation.

6 Claims, 17 Drawing Sheets

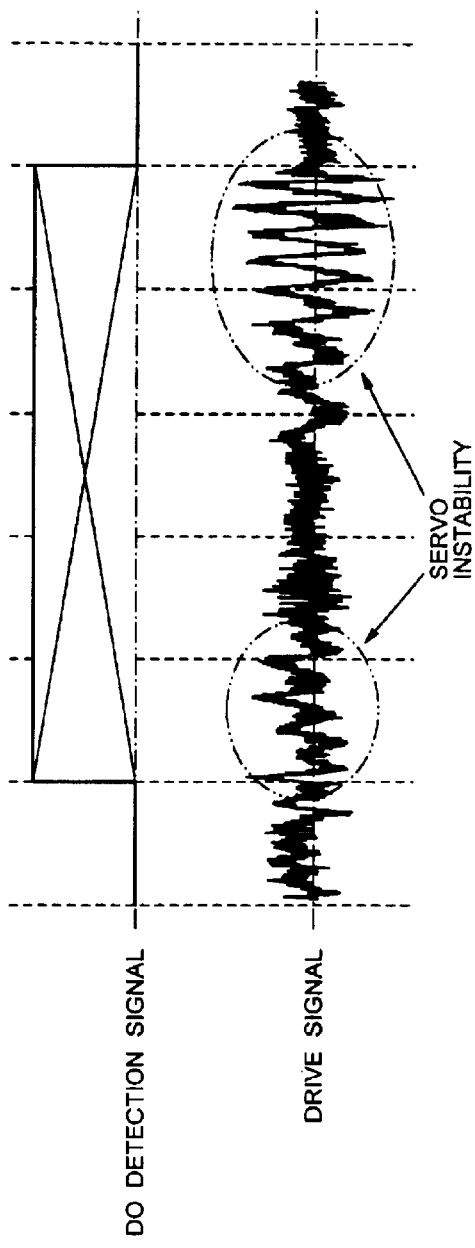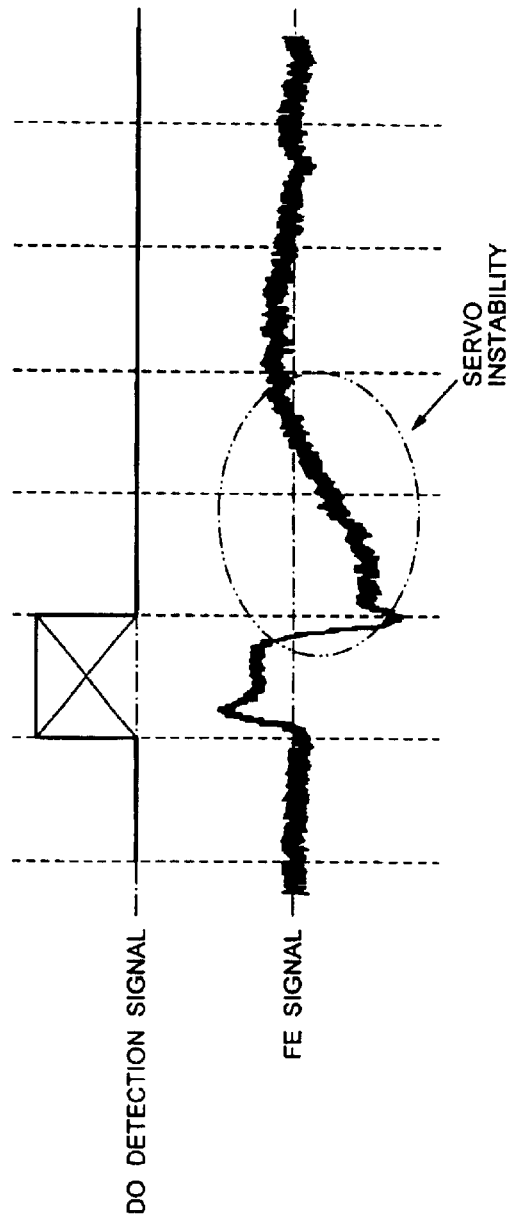

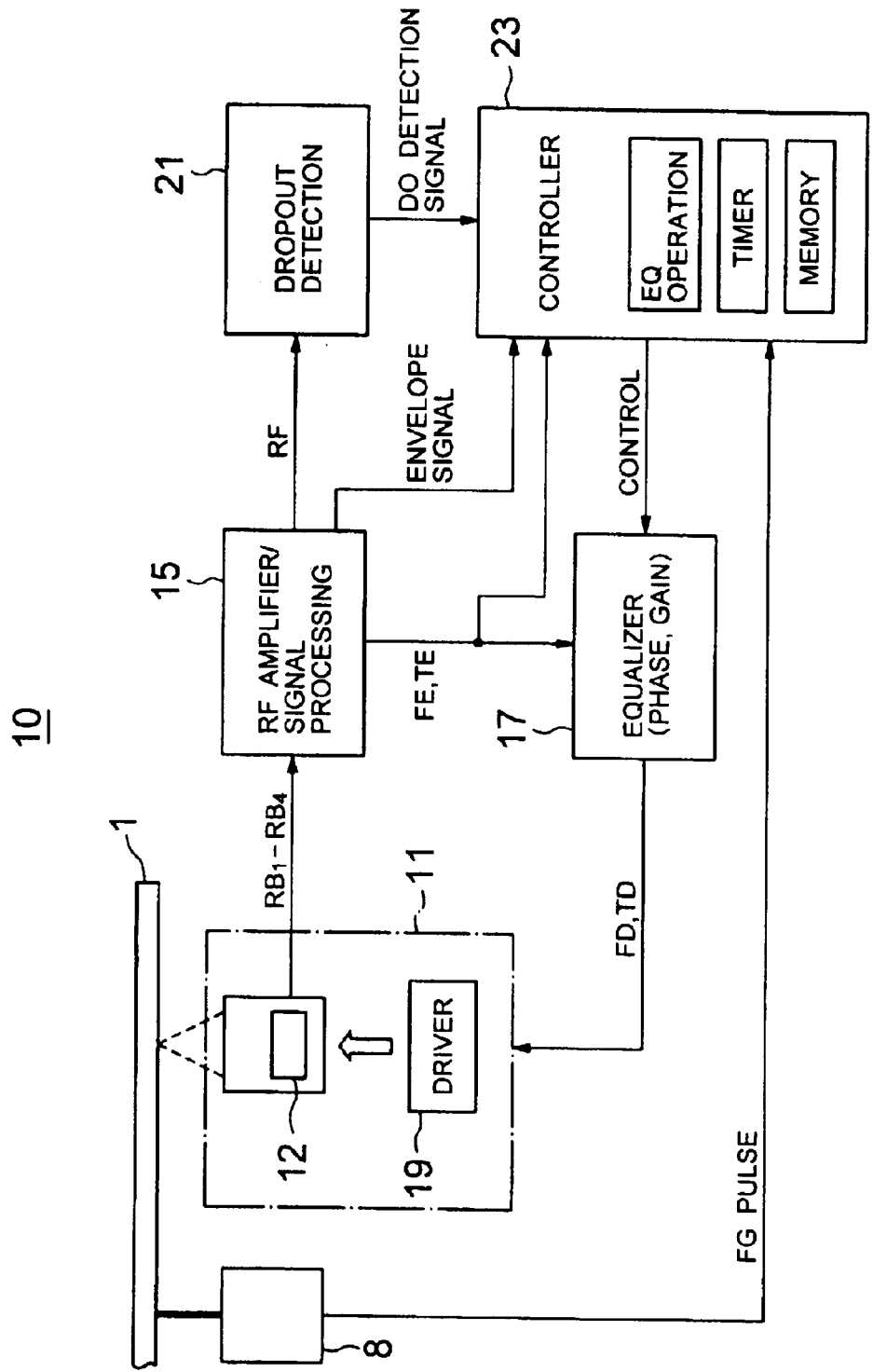

SERVO CONTROL APPARATUS FOR OPTICAL DISC PLAYER

BACKGROUND OF THE INVENTION

1. Field of the Invention

The present invention relates to an optical pickup servo-control apparatus for use with an optical disc player.

2. Description of the Related Art

Servo control is usually used to control an optical pickup for reading recorded information at a desired reading position for the purpose of achieving good reproduction performance in a player for optical discs, such as compact discs (CD) and digital versatile discs (DVD). An optical disc, however, usually contains defects, such as various kinds of flaws and contamination which occur during, for example, the manufacturing process or the use of the disc. Such defects impede a stable operation of the above-mentioned servo control.

FIG. 1 is a sectional view of an optical disc 1, showing the kinds of major defects which may occur. The optical disc 1 includes a protection layer 3, a reflective layer 4 which reflects the light beam emitted from the optical pickup, and a transparent cover layer 5 made of a transparent material such as a plastic and the like.

Referring to FIG. 1, a defect I is a flaw called an "interruption" in the reflective layer 4, caused in the manufacturing process of the disc. A defect II is a dirt called a "black dot" on the disc's surface or the transparent cover layer 5. A defect III is a "fingerprint" of human fat on the disc surface 7. A defect IV is a flaw called a "scratch" on the disc surface 7.

The existence of such defects on a disc causes "dropout" in read signal (RF signal) generated in the optical pickup when the disc is played, and deteriorates the controllability of servo control including tracking control, focusing control, tilt control and the like. A conventional method, for example, for preventing the adverse influence on servo control caused by such defect is to continue servo control by holding the control value of servo control, or the tracking error value, focus error value, or the like to the value before the defect was detected (hereinafter, simply referred to as "pre-value hold").

The servo control, however, becomes unstable when the dropout continues for a relatively long time or the dropout is of a burst type, because a bias or deviation value indicated by a value in the pre-value-hold method (hereinafter, simply referred to as a "hold value") drifts too far from the actual bias value. For example, the drive signal for the optical pickup drastically fluctuates during the period when a dropout occurs, causing servo control instability as shown in FIG. 2. In addition, as the transient phenomenon arises after termination of the dropout, servo control becomes unstable because the focus error signal is delayed in converging into a normal value, for example, as shown in FIG. 3. Therefore, the performance of servo control may be deteriorated or a gross deterioration in reproduction quality may be caused.

The defect such as a fingerprints or a black dot is usually formed over a plurality of tracks in the radial direction of the disc (i.e., in a certain range of a rotational angle of the disc). Servo control also needs to be stabilized effectively against such defects.

OBJECT AND SUMMARY OF THE INVENTION

Therefore, it is an object of the present invention to provide a servo control apparatus which has a high capability of dealing with various kinds of defects and of performing stable high-precision servo control.

To achieve the object, according to the present invention, there is provided a servo control apparatus of an optical pickup for reading recorded information from a recording medium to generate a read signal, which comprises an error signal extractor for extracting an error signal from the read signal, the error signal indicating a deviation from a servo target value of the optical pickup; a driver for changing the servo position of the optical pickup; an equalizer for equalizing the error signal to generate a drive signal for driving the driver; an integral value calculator for calculating an integral value of the error signal for each predetermined angular section of rotation of a track on the recording medium; a memory for storing each of the integral values for one rotation of the recording medium; a dropout detector to detect an occurrence of a dropout of the read signal; a variation calculator for calculating a variation by comparing the integral value for an angular section of rotation where the dropout occurred with a stored integral value for the identical angular section of rotation prior to the occurrence of the dropout; and a controller for changing an equalization characteristics of the equalizer in accordance with the variation.

BRIEF DESCRIPTION OF THE DRAWINGS

FIG. 2 shows changes of the drive signal supplied to the optical pickup during a dropout period.

FIG. 3 shows changes of the focus error signal due to the transient phenomenon after a dropout period.

FIG. 4 is a schematic block diagram of the configuration of a servo control apparatus for an optical disc player according to the present invention.

DETAILED DESCRIPTION OF THE PREFERRED EMBODIMENT

Figure 1:
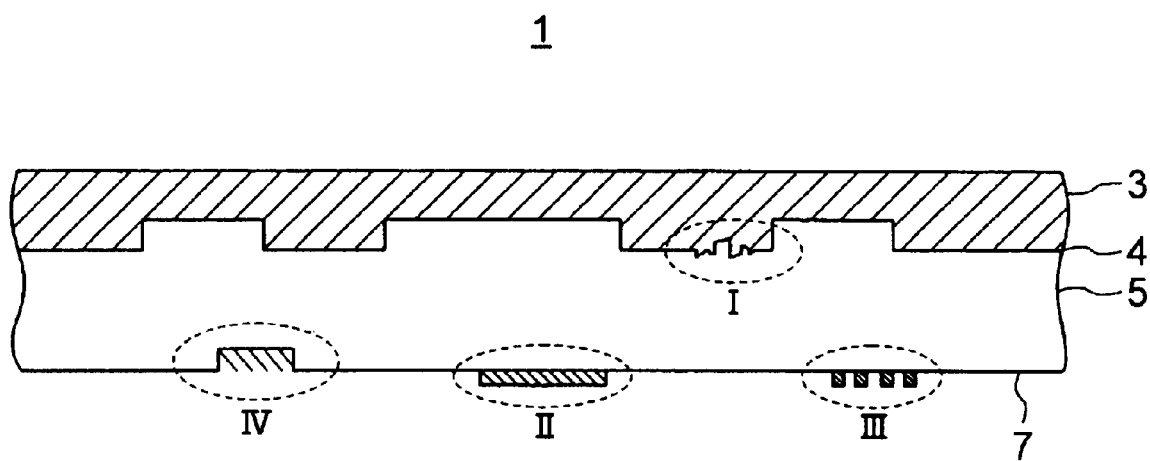
FIG. 1 is a sectional view of an optical disc schematically showing the kinds of major defects caused on an optical disc.

The embodiments of the present invention will be described in more detail with reference to the accompanying drawings. The same reference numerals refer to substantially similar elements throughout the drawings.

First Embodiment

FIG. 4 is a block diagram of the configuration of a servo control apparatus 10 of an optical disc player according to the present invention.

In FIG. 4, the optical disc 1 is rotated by a spindle motor 8. The spindle motor 8 is provided with an FG signal generator (not shown) for generating one pulse for each predetermined angle of spindle rotation. A generated FG pulse signal is supplied to a controller 23.

An optical pickup 11 emits a laser light beam on the optical disc 1, receives the light beam reflected from the optical disc 1, and generates a signal in response to the amount of the received light. An optical detector 12 provided in the optical pickup 11 is, for example, a 4-partitioned optical detector consisting of four light-receiving elements. Each of the four light-receiving elements receives the light reflected from a beam spot (not shown), converts it into an electric signal to output as read signals $RB_1$–$RB_4$, respectively. The optical pickup 11 is further provided with a driver 19 comprising a tracking actuator for making the direction of an objective lens (not shown) or the reading point thereof, biased in the radial direction, and a focusing actuator for adjusting the focusing point of the beam spot.

With the above-mentioned configuration, the optical pickup 11 reads recorded information from the optical disc 1, and supplies the read signals $RB_1$–$RB_4$ to a signal processing circuit 15.

An RF amplifier is provided in the signal processing circuit 15. The RF amplifier amplifies the read signals $RB_1$–$RB_4$, and extracts a tracking error signal TE and a focus error signal FE, based on the amplified read signals. More specifically, the signal processing circuit 15 generates the focus error signal FE using the read signals $RB_1$–$RB_4$. The focus error signal FE is a differential signal between two added signals obtained by adding read signals from the light-receiving elements diagonally opposing each other. The signal processing circuit 15 also generates a tracking error signal TE by the phase difference method using the read signals $RB_1$–$RB_4$, for example. The tracking error signal TE and the focus error signal FE generated in the signal processing circuit 15 are supplied to a servo-equalizer (hereinafter, simply referred to as an equalizer) 17.

As described in detail below, the equalizer 17 is a circuit for compensating the amplitude and phase of error signals, such as the tracking error signal TE and the focus error signal FE generated in the signal processing circuit 15. More particularly, the equalizer 17 performs equalization processing on error signals so as to have frequency characteristics suitable for servo control, and supplies the equalized signals to the driver 19 for the optical pickup 11 as drive signals TD and FD, respectively. The driver 19 generates actuator operating signals TDRV, FDRV based on the supplied drive signals TD and FD. The servo control is performed by operating the actuator in the optical pickup 11.

Furthermore, according to the present invention, there is provided a dropout detector 21 for receiving an RF read signal from the signal processing circuit 15 and for detecting defects formed on the optical disc 1, i.e., dropouts in the RF read signal; and a controller 23 for controlling the equalizer 17 in accordance with the dropout detection signal detected by the dropout detector 21, the above-mentioned FG pulse signal, and signals from the signal processing circuit 15. The controller 23 is provided with a timer, a memory for storing various data, such as the servo controlled value, the tracking error value, or the focus error value, and an operation section for calculating the coefficient of the equalizer 17 and the like as described below. The controller 23 is configured with, for example, a microcomputer or a plurality of circuit blocks.

In the servo control apparatus 10, a control range is determined in accordance with the transfer function of the actuator and/or the detection sensitivity of the error detectors including the optical system such that the servo does not get out of place even though a disturbance in the servo system such as wobbling rotation of the disc occurs. Gain characteristics and phase characteristics are set so that the system operates with stability within the range. In particular, equalization characteristics are determined so as to secure a sufficient phase margin in the required range of the servo system. More specifically, equalization is performed so as to obtain a sufficient phase margin in the frequency range where the gain characteristics of an open-loop transfer function become 0 dB. Equalization for focus servo, for example, is performed so as to obtain a sufficient phase margin within the frequency range of several hundred hertz to several kilohertz.

Figure 5:
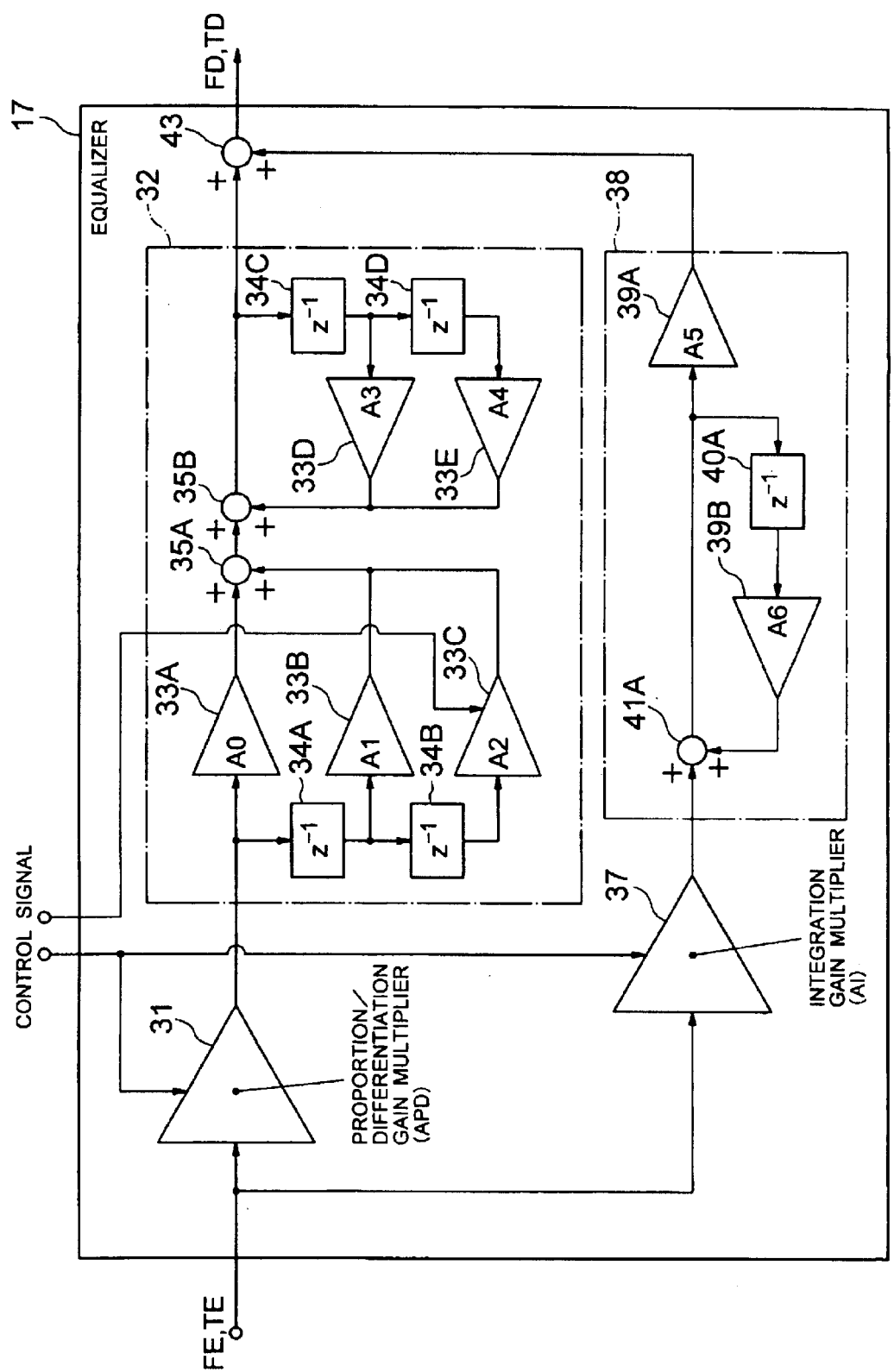
FIG. 5 is a schematic block diagram of the configuration of an equalizer according to a first embodiment of the present invention.

FIG. 5 shows the configuration of the equalizer 17 in the embodiment. The tracking error signal TE and the focus error signal FE extracted in the signal processing circuit 15 are supplied to a proportion/differentiation gain multiplier (APD) 31 to be multiplied by a coefficient bearing a predetermined gain. The multiplied error signals are supplied to a proportion/differentiation compensator 32 so as to undergo phase compensation.

The proportion/differentiation compensator 32 is composed of a filter which can shift the phase of an input signal. More specifically, a digital filter of the secondary IIR (infinite impulse response filter) and secondary FIR (finite impulse response filter) type can be used as shown in FIG. 5. The digital filter comprises coefficient multipliers 33A–33E, delay elements 34A–34D, and adders 35A–35B. The phase compensation characteristics can be changed by altering each of the coefficients A0–A4 of the coefficient multipliers 33A–33E.

The error signal from the signal processing circuit 15 is also supplied to an integration gain multiplier (AI) 37. The integration gain multiplier (AI) 37 multiplies the supplied error signal by a set gain, and supplies it to an integrator 38. The integrator 38 is so called a low-pass filter (LPF) including a primary IIR filter. In other words, the integrator 38 is an accumulating circuit for the low-pass components of error signals, and serves as a holding circuit for holding past low-frequency component of the error signals. An output signal from the integrator 38 is added to an output signal from the above-mentioned proportion/differentiation compensator 32 at an adder 43, and the signal obtained from the adder is supplied to the driver 19 of the optical pickup 11 as drive signals (TD, FD).

Thus, when the integration gain of the integration gain multiplier (AI) 37 increases, the output signal from the integrator 38 increases in magnitude, and the component, which is proportional to the current error, decreases in magnitude relatively. As a result, the tracking performance to current disturbances (for example, an unexpected disturbance such as dropout of an RF signal due to a defect) deteriorates, making it possible to avoid the influence of the disturbance temporarily. If this operation is continued, however, the focused state becomes impossible to be maintained due to a deterioration of the tracking performance to disturbances (for example, due to wobbling rotation of the disc) which should essentially be tracked. Thus, the integration gain and the proportional gain should be determined in respect to the above-mentioned tracking performance to current disturbances.

As is shown in FIG. 5, the gains of the proportion/differentiation gain multiplier (APD) 31 and the integration gain multiplier (AI) 37 can be changed by a control signal from the controller 23. Similarly, the phase characteristics of the proportion/differentiation compensator 32 can be changed by altering a coefficient of the coefficient multiplier (in the case shown in FIG. 5, coefficient A2, a secondary coefficient, of the coefficient multiplier 33C) by using a control signal from the controller 23. In the embodiment, the controller 23 generates control signals for the proportion/differentiation gain multiplier (APD) 31, the integration gain multiplier (AI) 37, and the proportion/differentiation compensator 32 based on the amplitude of the envelope signal of the RF read signal.

Figure 6:
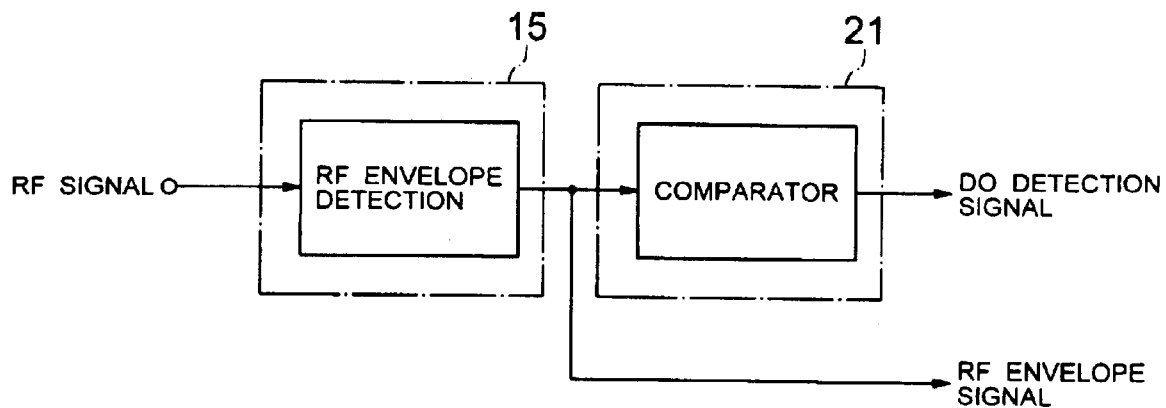
FIG. 6 is a schematic block diagram of the configuration for generating an envelope signal and a dropout detection signal.
Figure 7A:
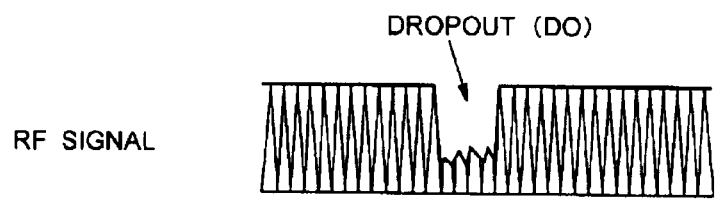
FIGS. 7A–7C are illustrating waveforms when an envelope signal is extracted from an RF read signal and a dropout detection signal is generated from the envelope signal.
Figure 7B:
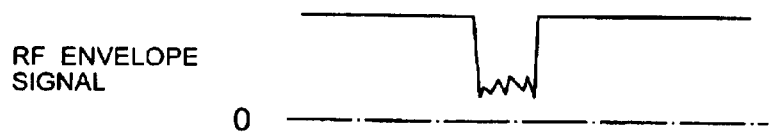
Figure 7C:
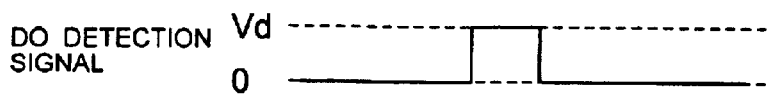

The generation of the envelope signal and the dropout detection signal will be described below with reference to FIGS. 6, and 7A–7C. As is shown in FIG. 6, the envelope signal (FIG. 7B) is extracted from an RF read signal (FIG. 7A) by an envelope detector circuit in the signal processing circuit 15, and supplied to the controller 23. The envelope signal is compared with a predetermined discrimination level in a comparator circuit in the dropout detector 21, and a dropout detection signal (FIG. 7C) having a predetermined voltage level (Vd) is generated. In the signal processing circuit 15, the generated envelope signal may be supplied to the controller 23 through a suitable low-pass filter (LPF).

Figure 8:
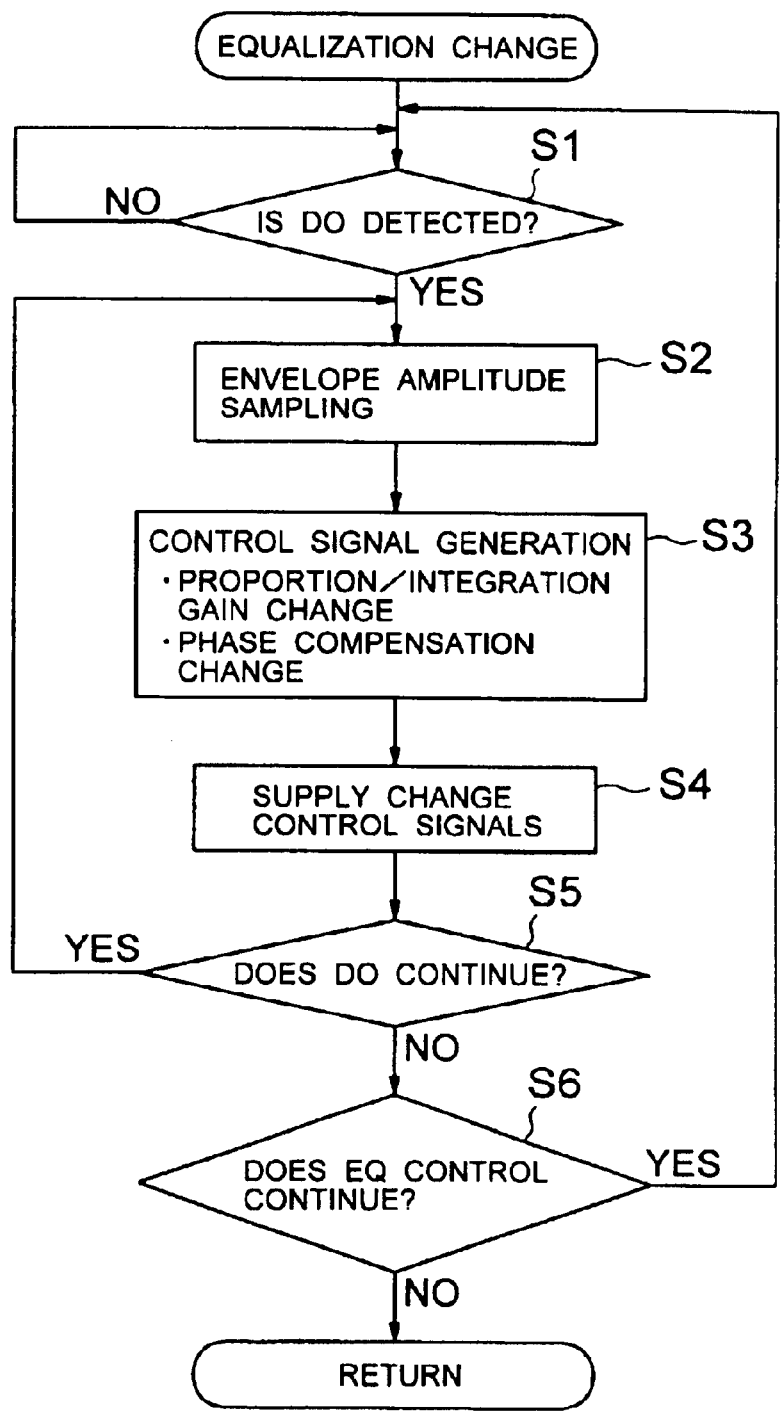
FIG. 8 is a flowchart of the procedure for changing the differentiation/integration gain characteristics and the phase compensation characteristics of the equalizer in accordance with the envelope level.

The operation performed by the controller 23 for controlling gains and phases will be described with reference to the flowchart in FIG. 8 and to FIGS. 9 and 10. It is determined whether or not any dropout is detected in the controller 23 (step S1). For example, it is determined whether or not a dropout has started by a rise (or fall) in the envelope signal. The amplitude of the envelope signal is then sampled in response to the dropout detection signal (step S2).

Figure 9:
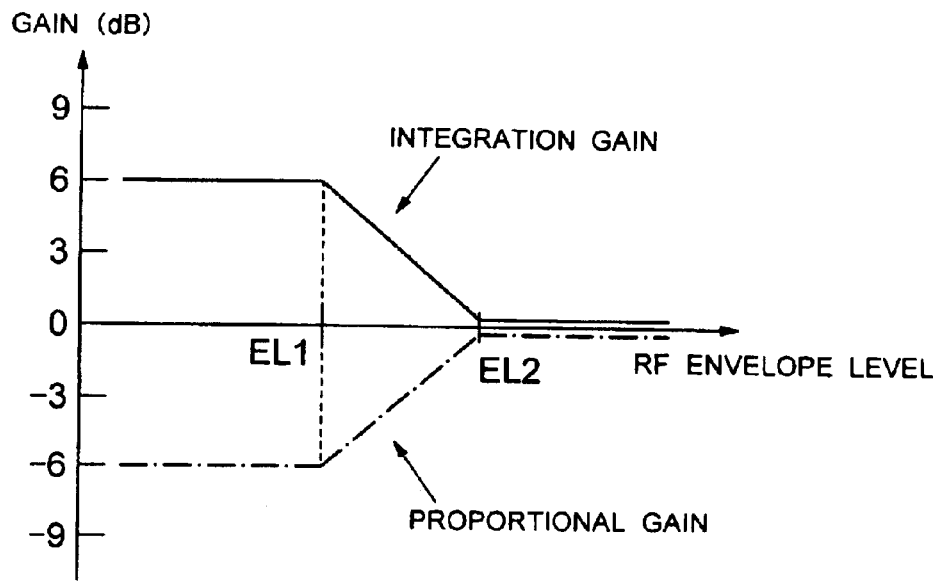
FIG. 9 is a graph of gain values against the envelope level when the equalizer differentiation/integration gain is changed.
Figure 10:
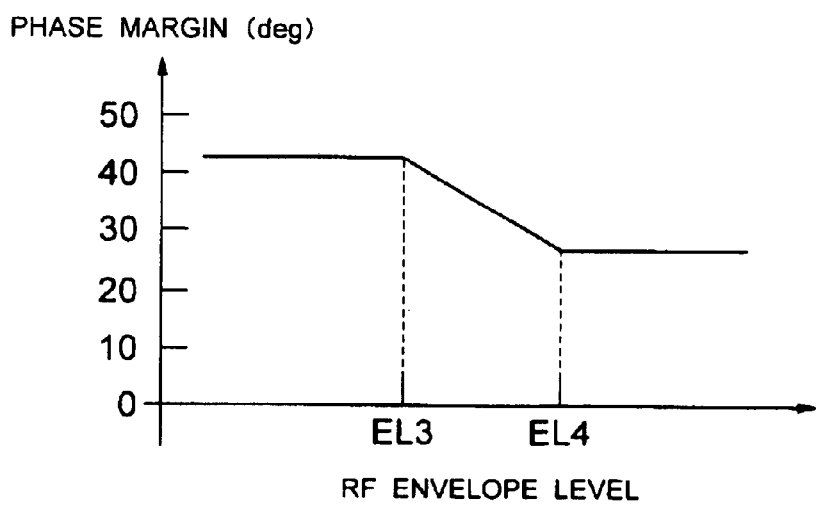
FIG. 10 is a graph of the envelope level phase margin when the equalizer phase compensation characteristics are changed.

As is shown in FIG. 9, the controller 23 generates a control signal for changing the gains of the proportional differentiation gain multiplier (APD) 31 and the integration gain multiplier (AI) 37 in accordance with the sampled amplitude. More particularly, when the envelope amplitude value (hereinafter referred to as "envelope levels") is below a predetermined value (EL1), a control signal is generated so as to decrease the proportional gain (−6 dB) and increase the integration gain (+6 dB) because the reliability of the error signal is low. On the other hand, when the envelope level exceeds another predetermined value EL2 ($\geq$EL1), the proportional and integration gains are not changed. In other words, a control signal indicating the change value of 0 dB is generated. When the envelope level is between EL1 and EL2, control is performed so as to change the change value of the proportional gain from −6 dB to 0 dB as the envelope level increases, and at the same time gradually change the integration gain from +6 dB to 0 dB.

As described above, the controller 23 further generates a control signal for changing the secondary coefficient (A2) of the proportion/differentiation compensator 32 in accordance with the envelope level. More particularly, a control signal is generated for changing the value of the coefficient so as to control transient phenomenon by increasing phase margin when the envelope level is below a first predetermined value (EL3), as is shown in FIG. 10. On the other hand, a control signal is generated to indicate that the phase is not to be changed when the envelope level exceeds a second predetermined value EL4 ($\geq$EL3). In this manner, a control signal is supplied to the equalizer 17 so as to change the gain and phase in accordance with the envelope level (step S4).

It is then determined whether or not the dropout is continuing (step S5). When the dropout is continuing, the procedure goes back to step S2 to sample the envelope amplitude, and to repeat the steps described above. When the dropout is terminated (i.e., when the dropout is disappeared), whether or not the control for changing the gain and phase is to be continued is determined (step S6). The procedure goes back to step S1 to repeat the above steps when the changing control is to be continued. Control exits the process routine when the changing control is not to be continued. Thus, the gain and phase of the equalizer 17 are controlled in accordance with an amplitude of the envelope signal during the period of time when dropout occurs as described above.

Although the embodiment has been described taking an example where both the proportional gain and integration gain are changed simultaneously, only one gain can be changed. In that case, all that needs to be done is to change the integration gain relative to the proportional gain. The above-described change value of gains and phase margin is a mere example. It may be set to a suitable value in accordance with the servo system to be used.

As described above, stable high-precision servo control is realized by changing the gain characteristics and phase characteristics of the equalizer 17 in accordance with the amplitude of the envelope signal during the period when dropout occurs.

Second Embodiment

Figure 11:
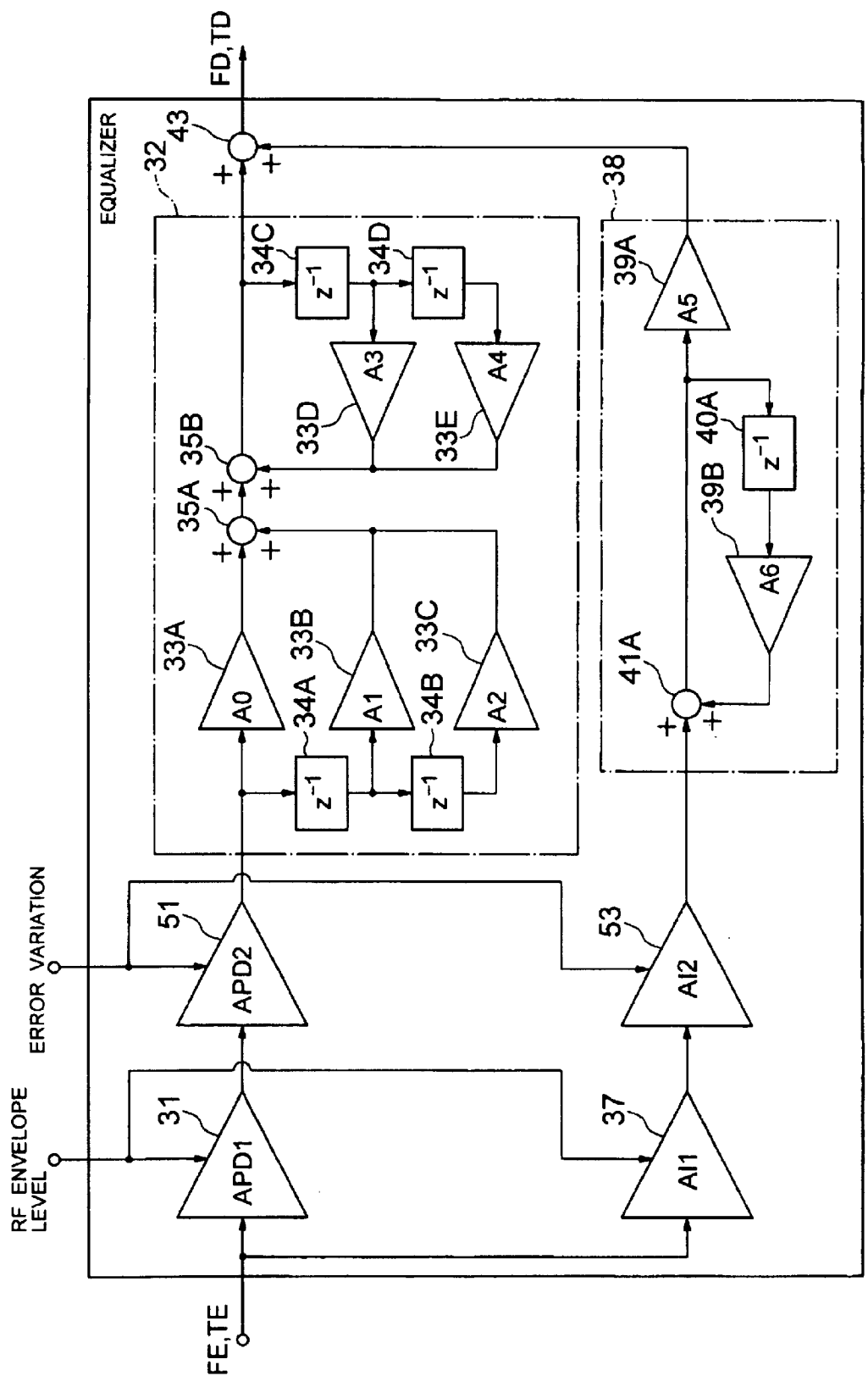
FIG. 11 is a schematic block diagram of the configuration of the equalizer in a servo control apparatus according to a second embodiment of the present invention.

FIG. 11 is a schematic diagram of the configuration of an equalizer in the servo control apparatus 10 according to a second embodiment of the present invention. The difference between the embodiment and the first embodiment is that, as is shown in FIG. 11, the equalizer 17 is further provided with a proportion/differentiation gain multiplier (APD2) 51 and a second integration gain multiplier (AI2) 53 so that the gains of the multipliers can be changed by a second control signal from the controller 23.

The controller 23 controls the equalization characteristics of the equalizer 17 using a second control signal for changing the integration gain of the second integration gain multiplier (AI2) 53 or the proportional gain of the second proportional differentiation gain multiplier (APD2) 51 in accordance with the change of an error signal in addition to the control signal for changing gains in accordance with the envelope level as described in the first embodiment.

In this embodiment, a change amount or variance of an error signal (hereinafter, simply referred to as "error change") defined below is used in order to complement gain control by the envelope level.

Error change=integral value of error (over an angular section of rotation where a dropout occurs)−integral value of error (over the same angular section of rotation before the dropout occurs).

In more detail, an integrated or integral value is obtained for an error signal over a range or section of rotational angle (hereinafter, refereed to as an angular section of rotation) on a track before a dropout occurs. An integral value is, then, obtained over the same angular section of rotation on a track where a dropout occurs. The error change is obtained by subtracting the integral value for the angular section of rotation where a dropout occurs from the integral value before the occurrence of the dropout for the same angular section of rotation.

More specifically, for example, the difference between an integral value of the error signal in one period of the FG signal when dropout occurred and an integral value of the error signal in the same FG signal period, i.e., in the same angular section on a different track as that of the former can be used. A drive signal may be used instead of the error signal.

Figure 12:
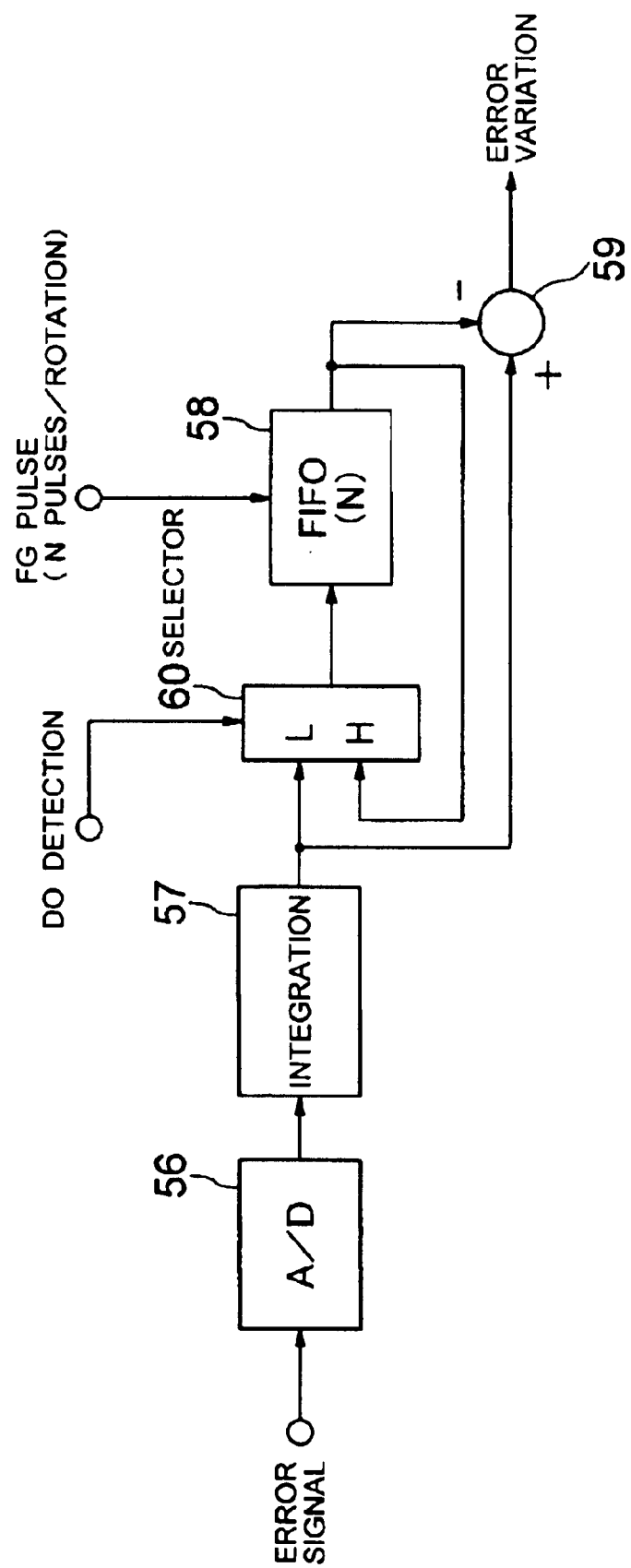
FIG. 12 is a diagram of an example in which an error change generation process is realized with individual circuit blocks.

The error change can be generated in the controller 23 as described above. The generation process of the error change can be performed in circuit blocks shown in FIG. 12. After an error signal is converted to a digital signal in an analog/digital (A/D) converter 56, an integral value is generated by an integration circuit 57. The integral value is supplied to an input terminal on the L terminal of a selector 60 and to a subtracter 59. An output terminal of the selector 60 is connected to an FIFO (first-in first-out) memory 58. The output from the FIFO memory 58 is supplied to an input H terminal of the selector 60. A dropout detection signal is supplied to a control terminal of the selector 60. With such configuration, the selector 60 supplies the integral value supplied from the integration circuit 57 selectively to the FIFO memory 58 when the dropout detection signal is on the L level, i.e., when dropout is not detected. Or, the selector 60 supplies an output signal from the FIFO memory 58 selectively to the FIFO memory 58 when the dropout detection signal is on the H level, i.e., when a dropout is detected.

The FIFO memory 58 consists of N stages of memories. An FG pulse signal having N pulses/rotation of the disc is supplied to the FIFO memory 58 through the gate circuit 60. The content of the memory 58 is sequentially supplied to the subtracter 59 in response to the FG pulse signal. In other words, the output from the subtracter 59 is an integral value of the error signal in the current angular section of rotation minus an integral value of the error signal in the same angular section of rotation on a different track. The above configuration is designed so that the supply of an integral value of the error signal to the FIFO memory 58 is forbidden and data in the FIFO memory 58 is not updated when a dropout is detected. Consequently, the latest integral value before a dropout is detected is stored in the FIFO memory 58.

Figure 13:
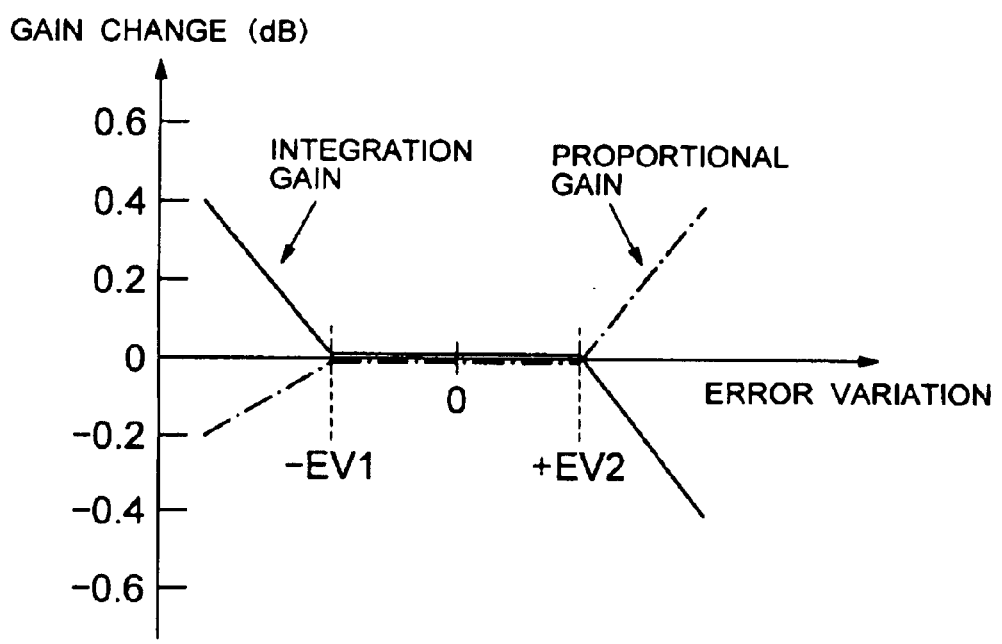
FIG. 13 is a graph of changes in proportional gain and integration gain against an error change.

The procedure of control operation performed by the controller 23 is similar to that in the first embodiment except that, in addition to the first control signal for changing gains in accordance with the envelope level, a second control signal for changing gains in accordance with the error change is supplied to the second proportion/differentiation gain multiplier (APD2) 51 and the second integration gain multiplier (AI2) 53 in the equalizer 17. More particularly, as is shown in FIG. 13, the controller 23 decreases the change of the proportional gain as the error change decreases when the error change is below a first predetermined value (EV1) in the negative region (in the case shown in FIG. 13, from 0 dB to −0.2 dB). The controller 23 increases the change of integration gain (from 0 dB to 0.4 dB) as well as decreases the proportional gain, thus increases the integration gain. Specifically, it is assumed that a normal error signal cannot be obtained due to the dropout (i.e., the error signal is assumed to be nearly 0). Therefore, control is maintained so as not to track the error signal affected by the dropout by increasing the integration gain as well as by decreasing the proportional gain. On the other hand, the change of proportional gain is increased (from 0 dB to 0.4 dB) as the error change increases when the error change exceeds a second predetermined value (EV2) in the positive region. More specifically, the change of integration gain is decreased (i.e., from 0 dB to −0.4 dB) at the same time as the proportional gain is increased, thus the integration gain is decreased. In other words, control is considered to be greatly deviated from the target state due to disturbances caused by the rotation of the disc and the like when an error change exceeds the second predetermined value (EV2) in the positive region. Thus, the integration gain is decreased so as to improve the tracking performance of the servo control apparatus to the disturbances at the same time as the proportional gain is increased. No compensation of the proportional gain and the integration gain is performed (i.e., 0 dB) when the error change is between the first predetermined value (EV1) and the second predetermined value (EV2). The change of the above gains can be suitably selected in accordance with the servo system or the kind of the disc to be used.

Figure 14:
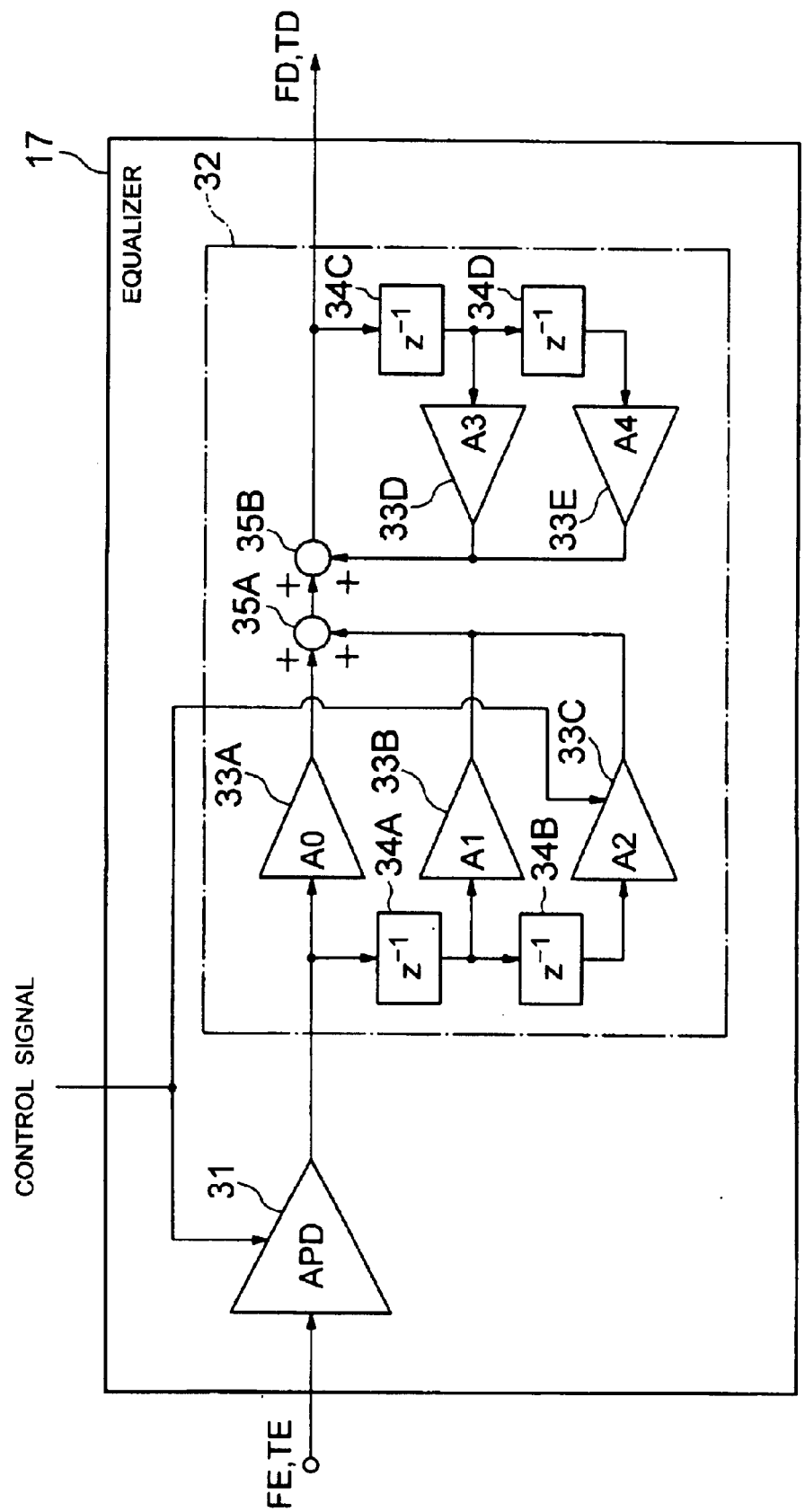
FIG. 14 is a schematic block diagram of the configuration of the equalizer according to a modification of the second embodiment of the present invention.

As described above, more stable high-precision servo control can be achieved by adding gain compensation to gain control by the envelope level. Although a description has been made of an example where the gains of the second proportion/differentiation gain multiplier (APD2) and the second integration gain multiplier (AI2) are adjusted so as to compensate the gain of the equalizer 17, the present invention is not limited to the case but applicable to various cases. For example, the control signal may be determined based on the above error change for changing the characteristics of the proportion/differentiation gain multiplier (APD) 31, the integration gain multiplier (AI) 37, and the proportion/differentiation compensator 32 in the equalizer 17 in FIG. 5, which is used for illustrating the first embodiment. Another possible design is, as shown in FIG. 14, to change the proportional gain or the phase characteristics of an equalizer having no integration gain multiplier (AI) 37.

As mentioned above, the characteristics of the equalizer 17 are adjusted by comparing the error change at the position on the track (i.e., angular section of rotation) where a dropout occurred with that in the same angular section on the track before the dropout occurred. Accordingly, servo control can be stabilized while a dropout is occurring even though there is a defect at a certain region over a plurality of tracks to cause the dropout of an RF signal. In addition, the transient phenomenon after the disappearance of the dropout can be controlled to realize stable high-precision servo control.

Third Embodiment

Figure 15:
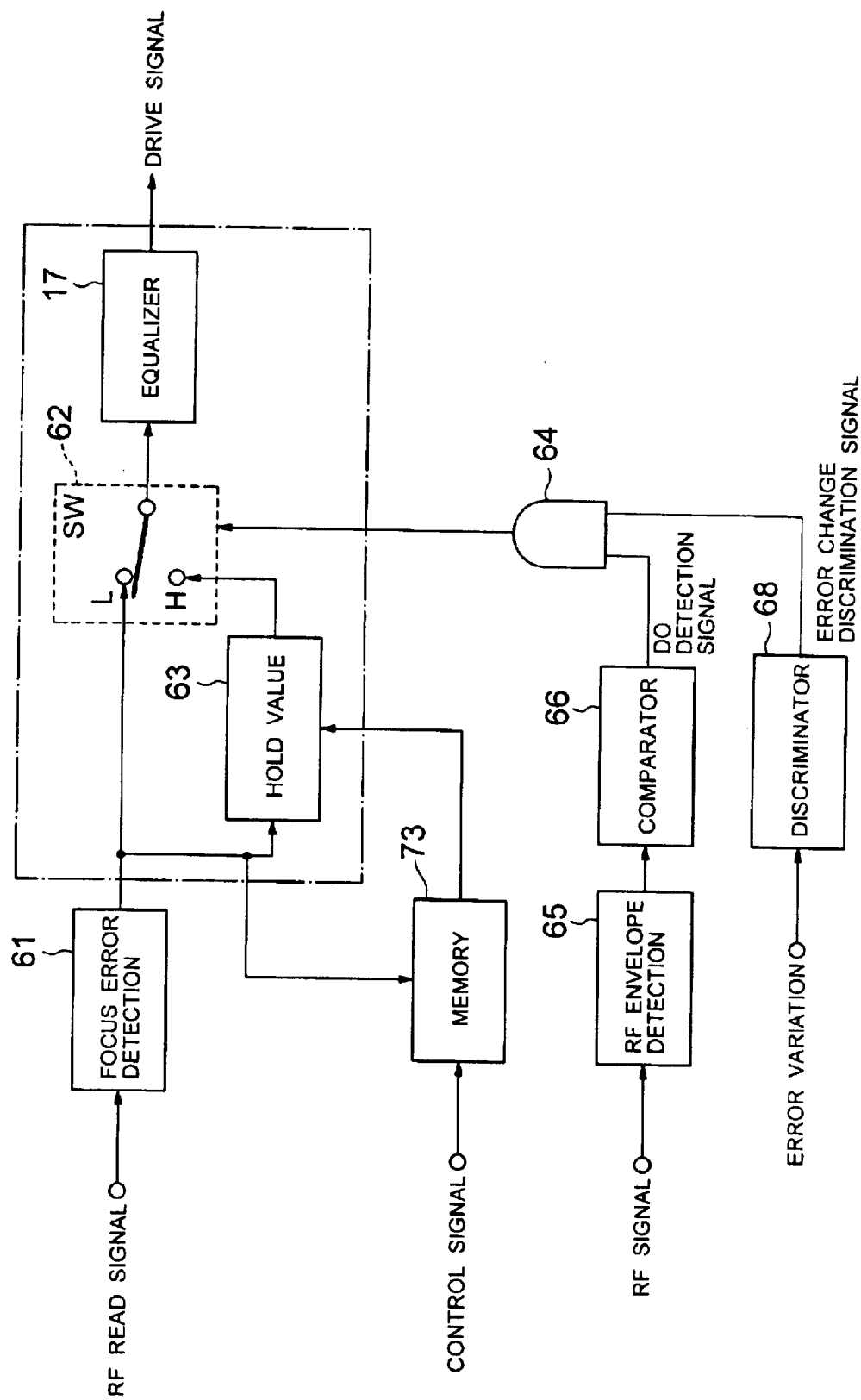
FIG. 15 is a block diagram of an example of the configuration of a servo control apparatus according to a third embodiment of the present invention.

FIG. 15 is a block diagram illustrating the configuration of a servo control apparatus 10 according to a third embodiment of the present invention. In order to simplify the description, the major part of the configuration of the servo control apparatus 10 is shown in circuit blocks.

In the embodiment, a focus error signal from a focus error detector 61 is supplied to the equalizer 17 through a switch 62, and at the same time, the error value indicated by the focus error signal is supplied to and held in an error value holder 63. The switch 62 selectively supplies a focus error signal from the focus error detector 61 or the error value from the error value holder 63 to the equalizer 17 in response to a logical signal from a logical AND circuit 64. The switch 62 takes the AND of a dropout detection signal from a comparator 66 and an error change discrimination signal from a discriminator 68 for discriminating whether an error change is below a predetermined value. In other words, the logical AND circuit 64 sends out a signal of H level when a dropout is detected and the error change is below a predetermined value, and causes the error value from the holder 63 to be supplied to the equalizer 17. A control signal from the controller 23 is supplied to a memory 73, and an error value corresponding to the angular section of rotation where the dropout occurred is output from the memory 73 to the holder 63 as a "hold value".

Although a description has been given of an example wherein the error value held is outputted from the memory 73 only when the error change is less than a predetermined value. The held error value may be supplied to the equalizer 17 when a dropout is detected.

The configuration mentioned above makes it possible to hold the servo control value for an angular section of rotation on a track where a dropout occurred to the value for the same angular section of rotation on a different track before the dropout occurred so as to realize stable high-precision servo control.

Fourth Embodiment

Figure 16:
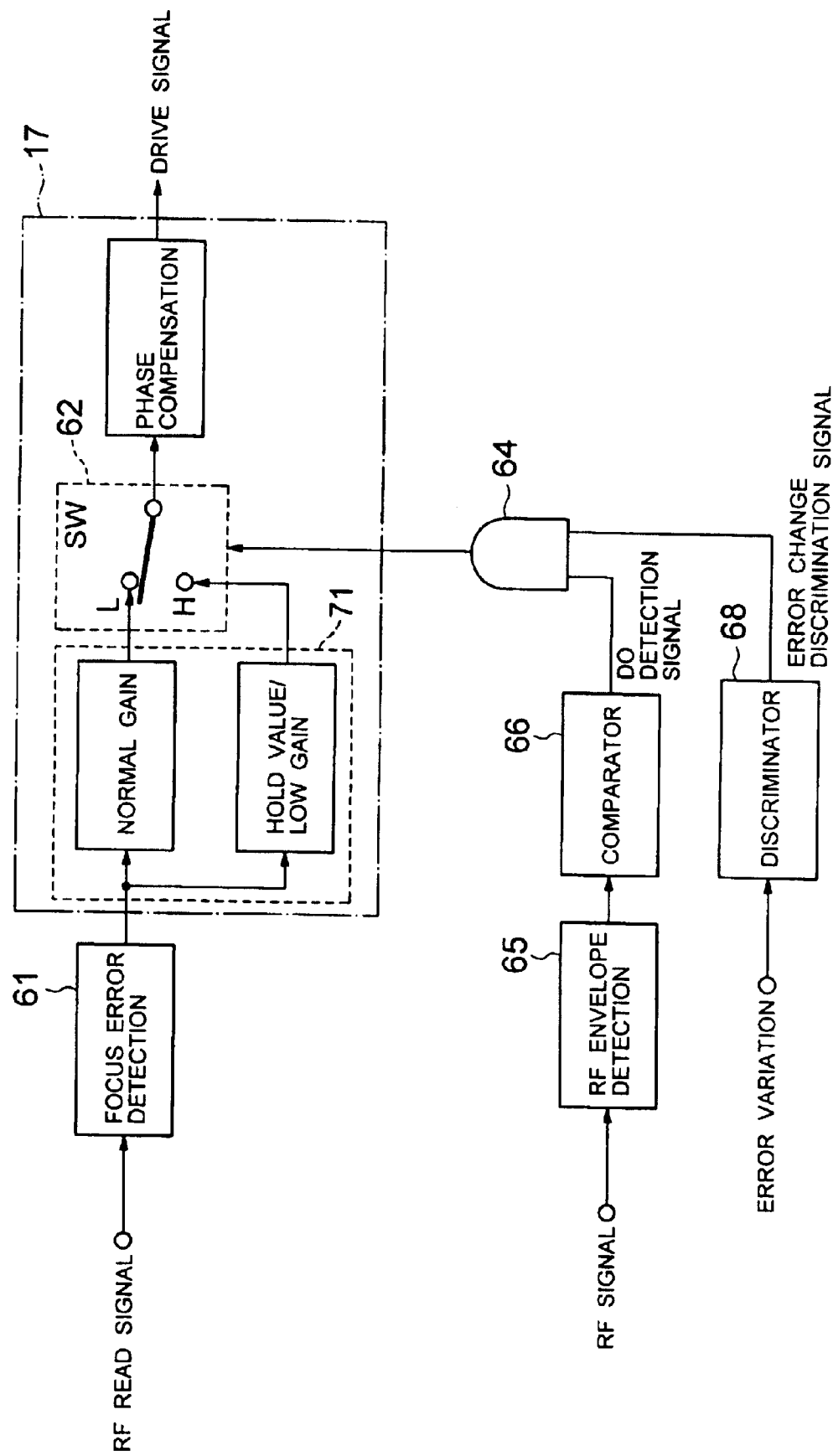
FIG. 16 is a block diagram of the major parts of a servo control apparatus, which is realized with circuit blocks, according to a fourth embodiment of the present invention.

FIG. 16 is a block diagram illustrating the configuration of a servo control apparatus 10 according to a fourth embodiment of the present invention. In the same manner as for the third embodiment, the major part of the configuration of the servo control apparatus 10 is shown in individual circuit blocks.

The difference between this embodiment and the above third embodiment is that the equalization characteristics of the equalizer 17 are changed in response to a dropout detection signal and an error change discrimination signal. A logical AND operation of a dropout detection signal and an error change discrimination signal are performed in the logic AND circuit 64, and the logical AND signal is supplied to the switch 62. Specifically, the gain of an amplifier 71 in the equalizer 17 is selectively switched to a low gain value during the period when a dropout is detected and the error change is below a predetermined value as shown in FIG. 16.

Figure 17:
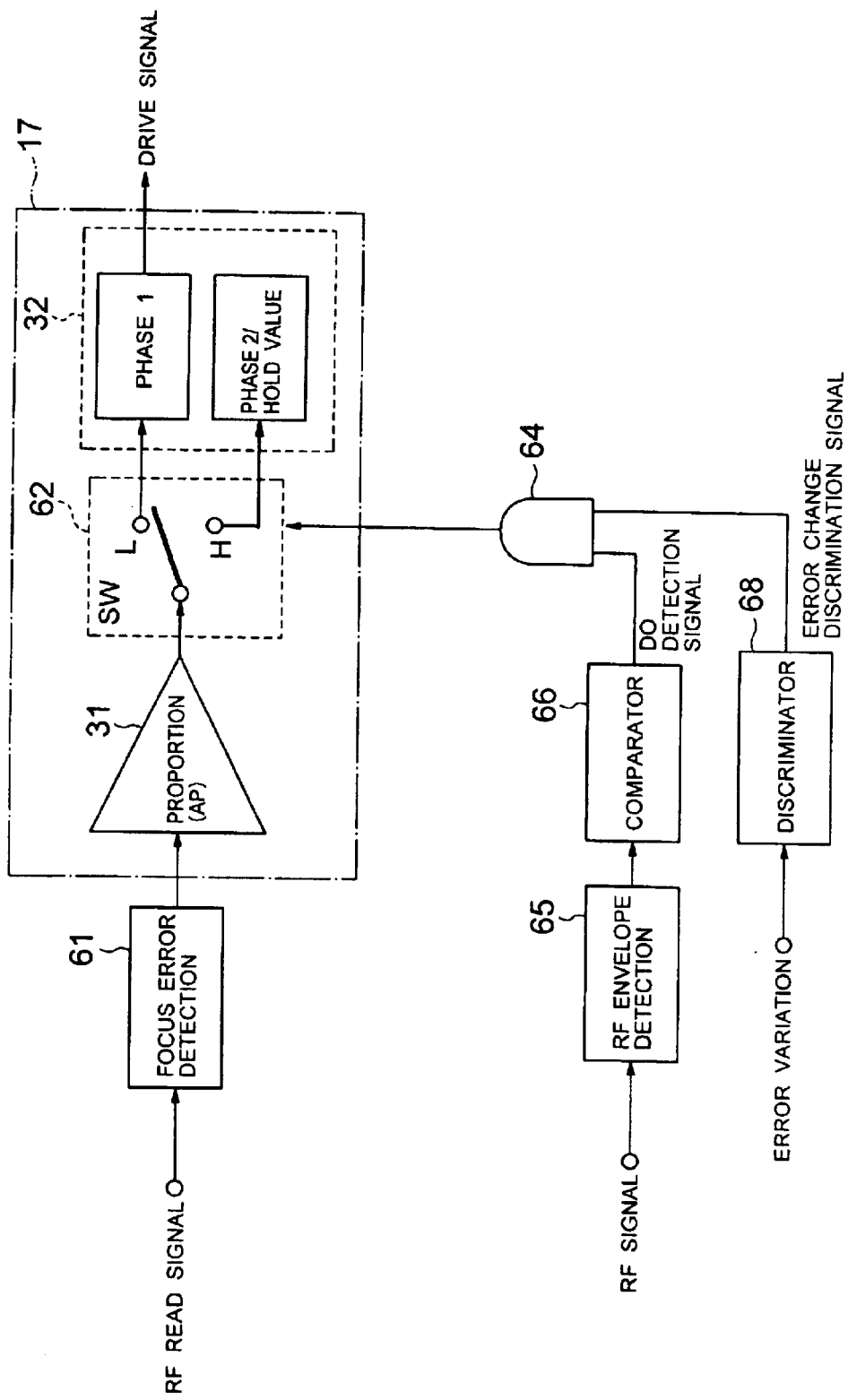
FIG. 17 is a block diagram of the major parts of a servo control apparatus according to a modification of the fourth embodiment of the present invention.

A modification of the embodiment is shown in FIG. 17, wherein the equalization characteristics of the equalizer 17 are changed in response to a dropout detection signal and an error change discrimination signal. The phase compensation value of the proportion/differentiation compensator 32 in the equalizer 17 is selectively switched to a second phase compensation value during the period when a dropout is detected and the error change is less than a predetermined value in the embodiment.

Fifth Embodiment

Figure 18:
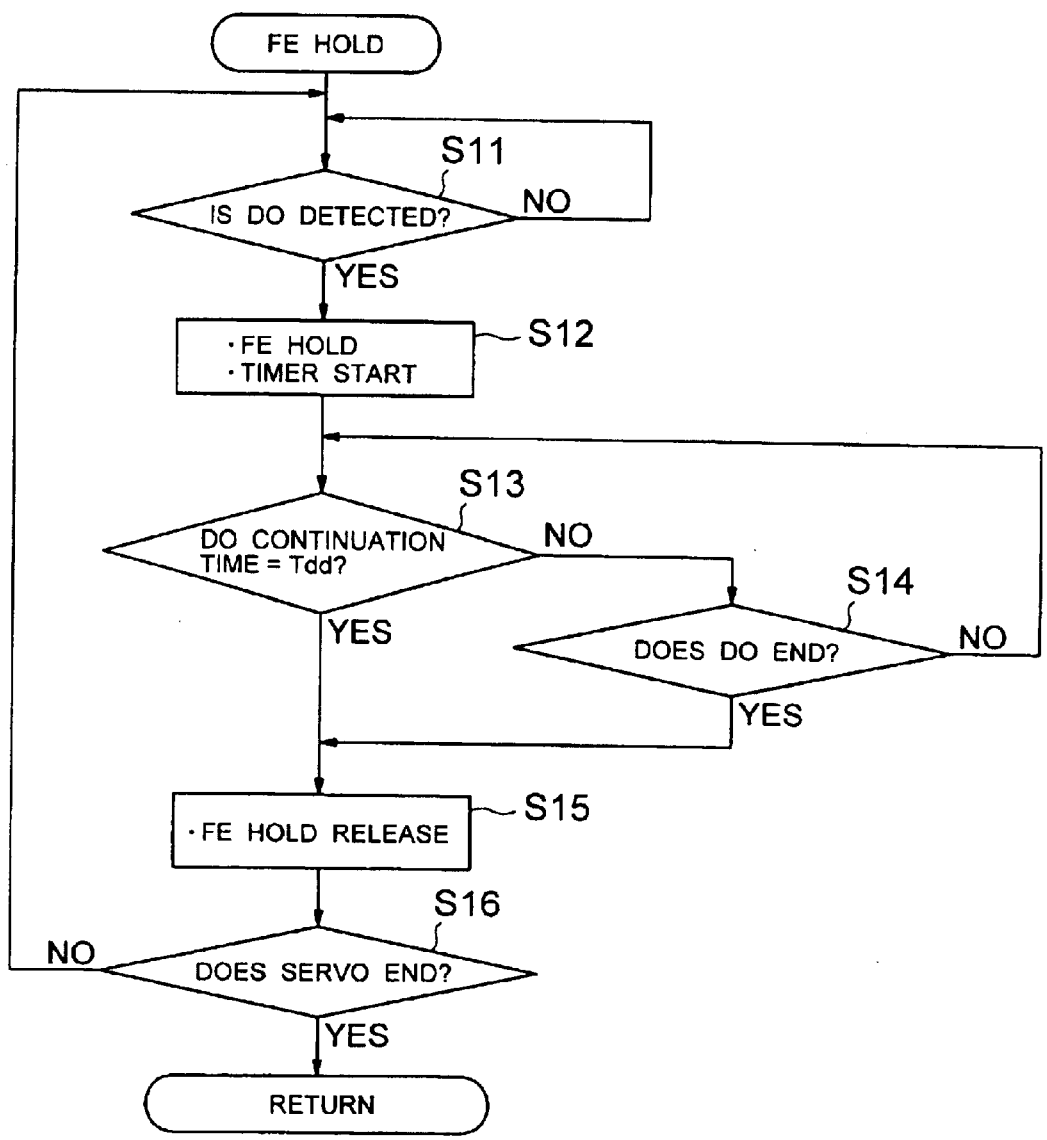
FIG. 18 a flowchart of the focus-error-hold procedure to be performed by a controller in a fifth embodiment of the present invention.
Figure 19:
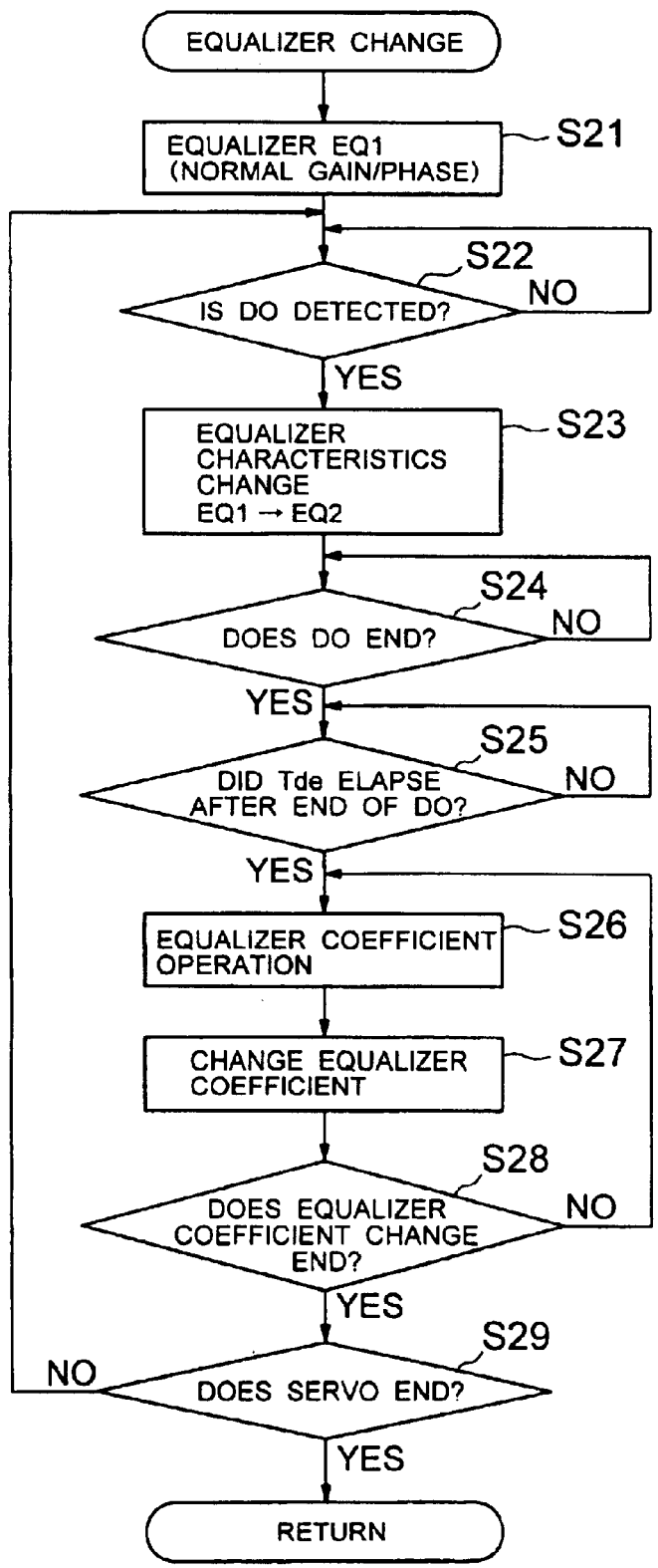
FIG. 19 is a flowchart of the equalizer equalization characteristics change procedure in the fifth embodiment of the present invention.
Figure 20:
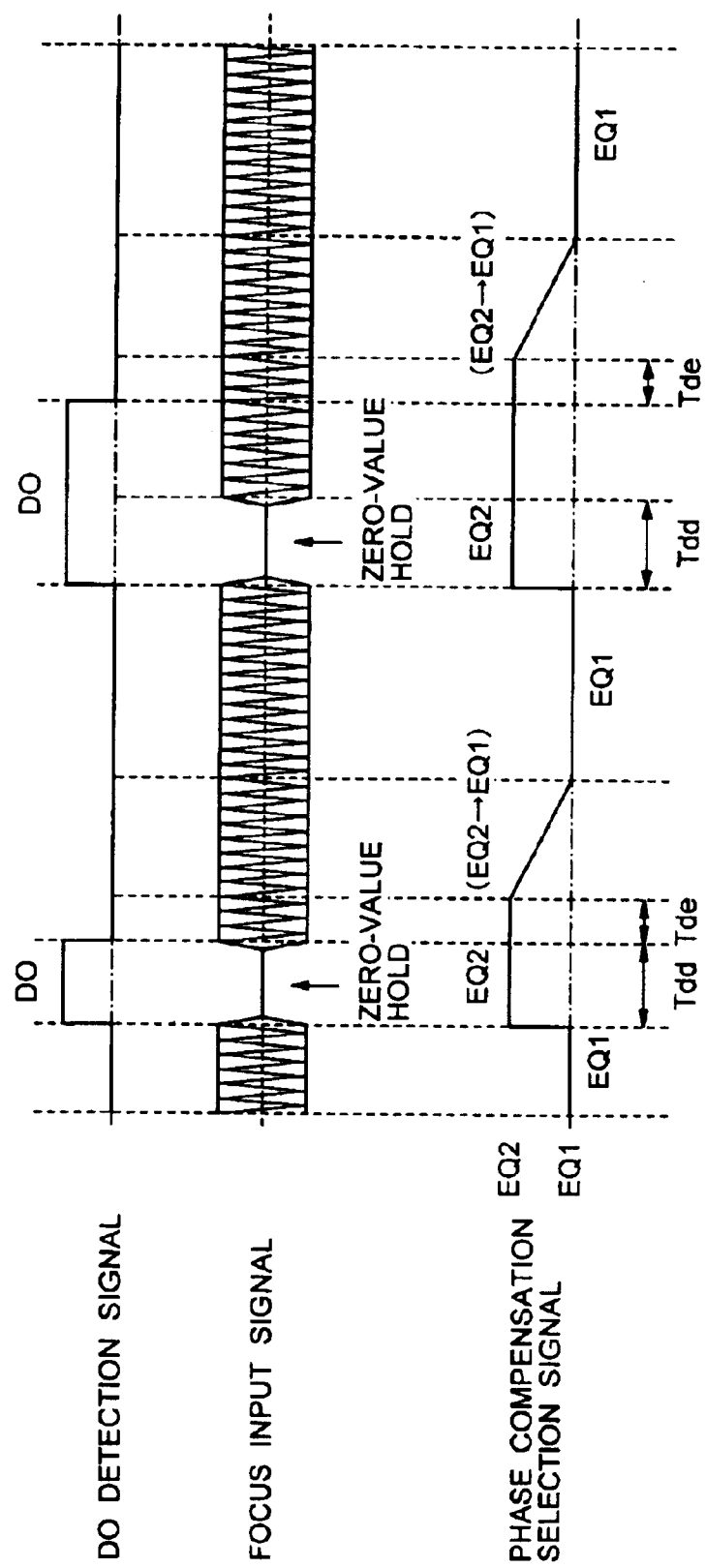
FIG. 20 is a time chart for illustrating an equalizer equalization change in the fifth embodiment of the present invention.

Referring now to FIGS. 18–20, a description is made for the servo control operation performed by a servo control apparatus 10 according to a fifth embodiment of the present invention. The configuration of the servo control apparatus 10 and the equalizer 17 is similar to that shown in FIGS. 4 and 5.

In the embodiment, the equalization characteristics of the equalizer 17 including the gain characteristics and phase compensation characteristics are changed during and after the occurrence of a dropout in order to control the transient phenomenon caused in an error signal due to the occurrence of the dropout. The procedure of the control operation is described in detail below.

FIG. 18 is a flowchart of a focus-error-hold operation to be performed by the controller 23. FIG. 19 is a flowchart of a procedure for changing the equalization characteristics of the equalizer 17. The procedures shown in the flowcharts are performed in parallel with each other. A time chart for illustrating the change of the equalization characteristics of the equalizer 17 is shown in FIG. 20.

Referring now to FIGS. 18 and 20, it is determined whether or not a dropout is detected by the controller 23 (step S11). For example, it is determined whether a dropout has started by the rise (or fall) of an envelope signal. A focus error value FE is then held to a predetermined value (for example, to 0) in response to the dropout detection signal. At the same time, the timer starts time measurement (step S12). During the dropout generation period, a focus error shows a transient oscillation, so the focus-error-hold operation controls the drive signal and stabilizes the operation of the optical pickup.

It is then determined whether or not the duration of a dropout has reached a predetermined time (Tdd) (step S13). When the duration of the dropout has reached the predetermined time (Tdd), the focus-error-hold operation is released (step S15). This is to prevent servo from becoming unstable because the focus-error hold time being prolonged more than is required may cause the servo to become unstable.

In step S13, if the duration has not reached the predetermined time (Tdd), it is determined whether or not the dropout has terminated (step S14). If the dropout has not terminated, the procedure goes back to step S13. On the other hand, if the dropout has terminated, the procedure goes on to step S15, and the focus-error-hold operation is released.

The presence of a control signal indicating the termination of servo control is discriminated (step S16) after the focus-error-hold operation is released in step S15. The procedure goes back to step S11 to repeat the above-mentioned procedures when servo control is to be continued. On the other hand, the current routine exits when servo control is to be terminated.

Referring now to FIGS. 19 and 20, a procedure for changing the equalization characteristics of the equalizer 17 is described. The equalization characteristics of the equalizer 17 are set to normal gain and phase characteristics, i.e., to the characteristics when no dropout occurs (EQ1) (step S21) by the controller 23. It is then determined whether or not a dropout is detected (step S22).

In response to the dropout detection signal, the equalization characteristics are changed to the equalization characteristics to be used in a dropout period (EQ2). At this time, it is preferable to increase the phase margin, and to change the phase compensation characteristics so as to obtain the maximum phase margin. Increased phase margin makes the convergence of an error signal waveform and also the rise of an RF signal faster so as to perform stable servo control. The change of phase compensation characteristics and gains can be performed by changing the coefficient value of the proportion/differentiation compensator 32 and an integration gain, for example. The change of a coefficient value may be performed by table read/write operation in the controller 23.

It is then determined whether or not the dropout has terminated (step S24). When the termination of the dropout is discriminated, it is determined whether or not a predetermined time (Tde) has passed since the termination of the dropout (step S25). If the predetermined time (Tde) has passed, a coefficient value is calculated (step S26) for changing the equalization characteristics of the equalizer 17, and the characteristics change is performed based on the calculated coefficient value (step S27). It is then determined whether or not the change of the equalization characteristics from EQ2 to EQ1 has been completed by the change of the coefficient value (step S28). If it has not been completed, the procedure goes back to step S26. As is shown in FIG. 20, the characteristics change is gradually performed from EQ2 to EQ1 by carrying out steps S26–S28 repeatedly.

When the change of the equalization characteristics is completed in step S28, the presence of a control signal indicating the termination of servo control is discriminated (step S29). If servo control is to be continued, the procedure goes back to step S22 to repeat the above-mentioned procedures. On the other hand, the current routine exits when servo control is to be terminated.

As described above, the convergence of an error signal waveform is made faster and the transient phenomenon after the occurrence of a dropout is controlled by changing the equalizer's characteristics in response to the occurrence and termination of a dropout or in response to the time which elapsed since the occurrence and termination of a dropout. Thus, stable high-precision servo control is realized.

Although a description has been given of an example in which the focus-error hold value is set to 0, a rotation component or a boost component may be used.

As the various embodiments mentioned above are for exemplification, their application in suitable combinations is possible. Similarly, each of the numerical values shown in the above embodiments is given only illustrative. The values may be determined properly in accordance with, for example, the servo system, the kind of disc, or the like to be used.

From the above description, it is clear that the present invention provides a servo control apparatus which can achieve stable high-precision servo control with a high defect treatment performance.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on a Japanese Patent Application No.2000-122468 which is hereby incorporated by reference.

What is claimed is:

1. A servo control apparatus of an optical pickup for reading recorded information from a recording medium to generate a read signal, comprising:

an error signal extractor for extracting an error signal from said read signal, said error signal indicating a deviation from a servo target value of said optical pickup;

a driver for changing the servo position of said optical pickup;

an equalizer for equalizing said error signal to generate a drive signal for driving said driver;

an integral value calculator for calculating an integral value of said error signal for each predetermined angular section of rotation of a track on said recording medium;

a memory for storing each of the integral values for one rotation of said recording medium;

a dropout detector to detect an occurrence of a dropout of said read signal;

a variation calculator for calculating a variation by comparing said integral value for an angular section of rotation where said dropout occurred with a stored integral value for the identical angular section of rotation prior to the occurrence of the dropout; and a controller for changing an equalization characteristics of said equalizer in accordance with said variation.

2. A servo control apparatus according to claim 1, wherein said equalizer includes an integrator for integrating said error signal to generate an error integration signal and an adder for supplying an added signal of an error proportional signal which is proportional to said error signal and said error integration signal to said driver; wherein said controller performs, in response to a detection of an occurrence of a dropout, at least one of decreasing the error proportional signal component in said drive signal and increasing the error integration signal component to change said equalization characteristics.

3. A servo control apparatus according to claim 2, wherein, when said variation is larger than a predetermined value, said controller decreases the error integrated signal component.

4. A servo control apparatus according to claim 1, further comprising:

a drive-amount storing device for storing a drive amount indicated by said drive signal for said each predetermined angular section of rotation and for each rotation of said recording medium, wherein said controller provides said driver with a stored drive amount corresponding to the angular section of rotation in which said dropout occurred, in response to the detection of said dropout.

5. A servo control apparatus according to claim 1, further comprising:

an error-amount storing device for storing an error amount indicated by said error signal for said each predetermined angular section of rotation and for each rotation of said recording medium, wherein said controller provides said equalizer with a stored error amount corresponding to the angular section of rotation in which said dropout occurred, in response to the detection of said dropout.

6. A servo control apparatus according to claim 5, wherein said controller stops a supply of the stored error amount to said equalizer.

* * * * *